Oct. 15, 1968 H. SEIDEL 3,405,570

MECHANICAL AMPLIFIER

Filed Oct. 23, 1965

INVENTOR
H. SEIDEL
BY Lyman Sherman
ATTORNEY

United States Patent Office 3,405,570

Patented Oct. 15, 1968

1

3,405,570

MECHANICAL AMPLIFIER

Harold Seidel, Fanwood, N.J., assignor to Bell Telephone Laboratories, Incorporated, New York, N.Y., a corporation of New York Filed Oct. 23, 1965, Ser. No. 503,587

2 Claims. (Cl. 74—661)

ABSTRACT OF THE DISCLOSURE

The present invention is based upon the recognition that a mechanical differential, of the type commonly used in an automobile, is a reactive mixer. As such the principle of parametric interaction can be applied to the mechanical differential to produce a mechanical parametric amplifier in which a relatively small, externally applied torque, is amplified and used to overcome a significantly larger load torque.

In one embodiment of the invention, "pump" power, in the form of rotational energy, is applied to one shaft of a three shaft differential. A second shaft, constituting the "signal" shaft is coupled to an output load. This load produces a torque $T_L$ on the signal shaft. The third shaft, constituting the "idler" shaft, is loaded by means of a friction brake.

An input signal, in the form of an externally applied torque, is applied to the signal shaft. The amount of signal torque, T, required to overcome the load torque $T_L$ is equal to $T_L - T_I$, where $T_I$ is the idler shaft torque provided by the friction brake.

In a second embodiment of the invention, a second differential is utilized to automatically vary the idler torque so as to maintain a constant signal torque, regardless of variations in the load torque.

This invention relates to mechanical parametric amplifiers.

Parametric interaction, as a means for producing amplification, has taken giant strides within the past decade. While its use in the recent past had been in the area of low noise electromagnetic amplification, more recently it has been applied to optical modulation and high frequency acoustical interaction.

It is the broad object of the present invention to apply the principles of parametric interaction to mechanical amplifiers.

The history of parametric phenomena is given briefly by W. W. Mumford in his article, "Some Notes on the History of Parametric Transducers," published in the May 1960 issue of the Proceedings of the Institute of Radio Engineers, pp. 848–853. Broadly stated, parametric interaction involves the coupling of energy between signals of different frequencies. In the most general system, energy is coupled into the system at some high frequency, called the "pump" frequency, and is coupled to two other frequencies, called the "idler" and "signal" frequencies. It is characteristic of such a system that the sum of the idler and signal frequencies is equal to the pump frequency.

The present invention is based upon the recognition that a mechanical differential of the type commonly used in an automobile, is a reactive mixer in which the angular speed and torque for the three shafts obey the relationships $$N\omega_1 + M\omega_2 + \omega_3 = 0 \quad (1)$$

and $$\frac{T_1}{N} = \frac{T_2}{M} = T_3 \quad (2)$$

2 where $\omega$ is the angular shaft speed

N and M are constants, and

T is the shaft torque.

In accordance with the invention, the principles of parametric interaction are applied to the mechanical differential to produce a mechanical parametric amplifier in which a relatively small torque is amplified and used to overcome a significantly larger torque.

In a first illustrative embodiment of the invention, pump power, in the form of rotational energy, is applied to the drive shaft of a three-shaft differential. One of the "axle" shafts of the differential, constituting the "signal" circuit of the system, is provided with an output load, in the form of a weight hanging on a drum. This load produces a torque $T_L$ on the "signal" shaft. The other "axle" shaft, constituting the "idler" circuit of the system, is loaded by means of a Prony (friction) brake.

An input signal, in the form of an externally applied torque, is supplied to the signal shaft. The amount of signal torque, T, required to lift the weight is equal to the difference between the load torque, $T_L$, and the idler loading torque, $T_I$, provided by the Prony brake.

In a second embodiment of the invention, a second differential is utilized to vary automatically the idler torque so as to maintain a constant signal torque, regardless of variations in the load torque.

These and other objects and advantages, the nature of the present invention, and its various features, will appear more fully upon consideration of the various illustrative embodiments now to be described in detail in connection with the accompanying drawings, in which.

Figure 1:
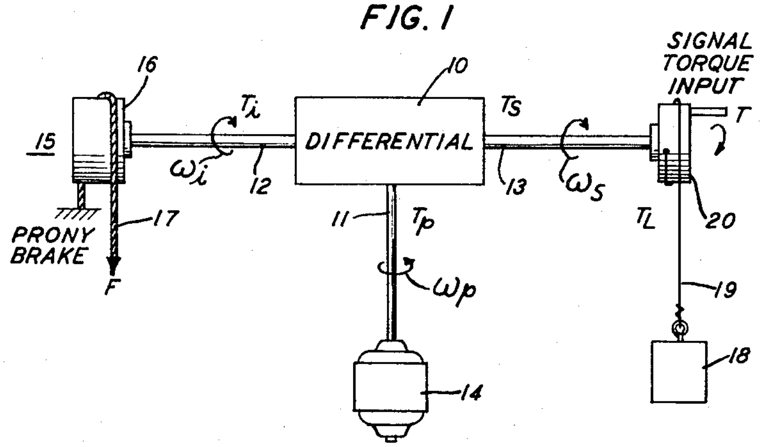
FIG. 1 is a first embodiment of the invention.

Referring to the drawings, FIG. 1 is a first illustrative embodiment of the invention using a mechanical differential as a reactive mixer in a mechanical parametric amplifier. As will be explained in greater detail hereinbelow, by suitably loading and driving the several shafts of the differential, a relatively small, externally applied signal torque is amplified and used to overcome a much larger load torque.

The amplifier of FIG. 1 comprises a differential 10 with which there are associated three rotatable shafts 11, 12 and 13. The term "differential" is used in its accepted sense to designate that class of mechanism having two degrees of freedom, so arranged that the motion of one part can be expressed as a linear function of the motion of two other parts. In a typical bevel gear differential, of the type used in the rear axle of an automobile and described on pages 305 et seq of "Kinematics and Design of Mechanism" by Alexander Cowie, published by International Textbook Company, 1961, the rotational velocities of the three shafts are related by $$\frac{\omega_i}{2} + \frac{\omega_s}{2} = \omega_p \quad (3)$$

where $\omega_p$, $\omega_i$ and $\omega_s$ are the angular velocities of shafts 11, 12 and 13, respectively. By the use of suitable gear combinations on the several shafts, the angular velocities can be expressed more generally as $$N\omega_i + M\omega_s = \omega_p \quad (4)$$

where N and M are integers.

Comparing Equations 3 and 4, it is seen that in the absence of any special gearing, N and M are equal to ½ for the simple bevel gear differential.

The general power relationships among the three shafts is given by $$\frac{P_i}{N\omega_i}=\frac{P_s}{M\omega_s}=\frac{P_p}{\omega_p} \qquad (5)$$

where $P_p$, $P_i$ and $P_s$ are the power on shafts 11, 12 and 13, respectively.

For $N=M=\frac{1}{2}$, Equation 5 becomes $$\frac{2P_i}{\omega_i}=\frac{2P_s}{\omega_s}=\frac{P_p}{\omega_p} \qquad (6)$$

From Equation 6, the torque relationships for the three shafts can be written as $$2T_i=2T_s=T_p \qquad (7)$$

Thus, for the bevel gear differential, Equation 7 states that the torque applied to shaft 11 (the drive shaft) is divided equally between shafts 12 and 13 (the axle shafts). With respect to shafts 12 and 13, Equation 7 states that the torques on the two axle shafts are always equal. Equation 3 states that the sum of the angular velocities of the axle shatfs is equal to twice the angular velocity of the drive shaft.

The terms "drive" shaft and "axle" shaft are terms commonly associated with mechanical differentials. For purposes of explanation, however, the three shafts of differential 10 can be equated to the component circuits of an electrical parametric amplifier by recognizing that in an electrical parametric amplifier, power, delivered by a pumping source, is divided between an idler circuit and a signal circuit, and that the signal and idler frequencies are linearly related to the pumping frequency. Thus, in the embodiment of FIG. 1, shaft 11 can be identified as a pumping circuit, shafts 12 as an idler circuit, and shaft 13 as a signal circuit. The shafts of the differential can, accordingly, be referred to more specifically as the pumping shaft, the idler shaft and the signal shaft. So designated, the several shafts are suitably energized and/or loaded in the following manner.

Pumping power is applied to the pumping circuit of the mechanical amplifier by means of a motor 14 which rotates pumping shaft 11 at a uniform angular speed $\omega_p$. The torque applied to shaft 11 by motor 14 is designated $T_p$.

Since the idler circuit of a parametric amplifier must dissipate power at the idler frequency, idler shaft 12 is loaded down by some suitable means such as a Prony brake 15. The amount of torque, $T_i$, applied to shaft 12 by brake 15 is controlled by the amount of frictional force exerted by strap 17 on drum 16.

A useful load, in the form of a weight 18 to be lifted by means of cable 19 and drum 20, is connected to the end of signal shaft 13. It will be understood that this representation of a useful load is merely illustrative. The load, however, whatever its nature, provides a torque $T_L$ to shaft 13. It is this torque which is to be overcome by the combination of a relatively small, externally applied signal torque, T, and the torque developed in signal shaft 13 by the mechanical amplifier.

The operation of the amplifier of FIG. 1 can be explained and understood by considering several different operating conditions, and applying the speed and torque relationships given by Equations 3 and 7 to these various operation conditions. For example, when the loading produced by the Prony brake is zero (no power dissipation in the idler circuit), the idler shaft rotates freely and the idler torque $T_i$ is zero. For this condition, it would require the application of a signal torque T that is at least equal to the load torque $T_L$ to lift weight 18. This is equivalent to an amplifier gain $T_L/T$ of unity. If, however, a signal torque of that amplitude is not available, there is no rotation of the signal shaft, and $\omega_s$ is zero.

Neglecting any frictional losses in the system described above, the torque $T_p$ delivered by motor 14 is likewise zero, and the motor runs freely at an angular speed $\omega_p$. Since $\omega_s$ is zero, the idler shaft rotates at $2\omega_p$. This is precisely the situation encountered when one of the rear wheels of a car is slipping on ice. With little torque developed by the slipping wheel, little torque can be delivered to the other rear wheel, and the car, typically, is immobilized.

If strap 17 of the Prony brake is now tightened so as to develop a significant frictional force on drum 16, a corresponding torque $T_i$ is developed in the idler shaft and an equal torque $T_s=T_i$ is developed in the signal shaft.

When $T_s$ is less than $T_L$, shaft 13 cannot rotate unless an externally applied signal torque $T=T_L-T_s$ is simultaneously applied to shaft 13. The signal torque T is less than the load torque $T_L$ by the amount of torque developed in the idler shaft. Thus, the gain of the amplifier, given by the ratio of the output (torque) to the input (torque), is $$\frac{T_L}{T}=\frac{T_L}{T_L-T_i}$$

The rate at which the signal torque is applied is $\omega_s$, and can vary from a very low value to $2\omega_p$. For $\omega_s$ equal to $2\omega_p$, the idler shaft speed is reduced to zero, since $\omega_i=2\omega_p-\omega_s$. An attempt to operate at $\omega_s$ greater than $2\omega_p$, requires that the idler shaft reverse direction. This means that the signal must now lift the weight unaided by the parametric amplifier and, in addition, provide the power dissipated in the idler circuit. That is, for $\omega_s$ greater than $2\omega_p$, T must increase from $T_L-T_i$ to $T_L+T_i$.

In the final situation to be considered, the power dissipated in the Prony brake is large enough to develop a torque $T_i$, in the idler circuit, that is larger than $T_L$. This means that the torque $T_s$ developed in the signal shaft is large enough to overcome the load torque $T_L$ without the application of an external signal torque. This, of course, is recognized as an oscillating state.

The mechanical parametric amplifier described above has several significant advantages. First, it makes no use of electrical amplifiers and, as such, has no implicit power limitations characteristically associated with their use. Second, unlike the electrical parametric amplifier, it is insensitive to large changes in pumping frequency. The pumping frequency can change over a significant range without affecting the operation of the amplifier other than to change the idler shaft frequency. In the mechanical amplifier, the idler shaft speed is of no consequence.

Third, since all components of the amplifier are mechanically linked, there is no position error inherent in the system. Finally, the amplifier response is flat over the entire range $|\omega_s|<|2\omega_p|$.

Figure 2:
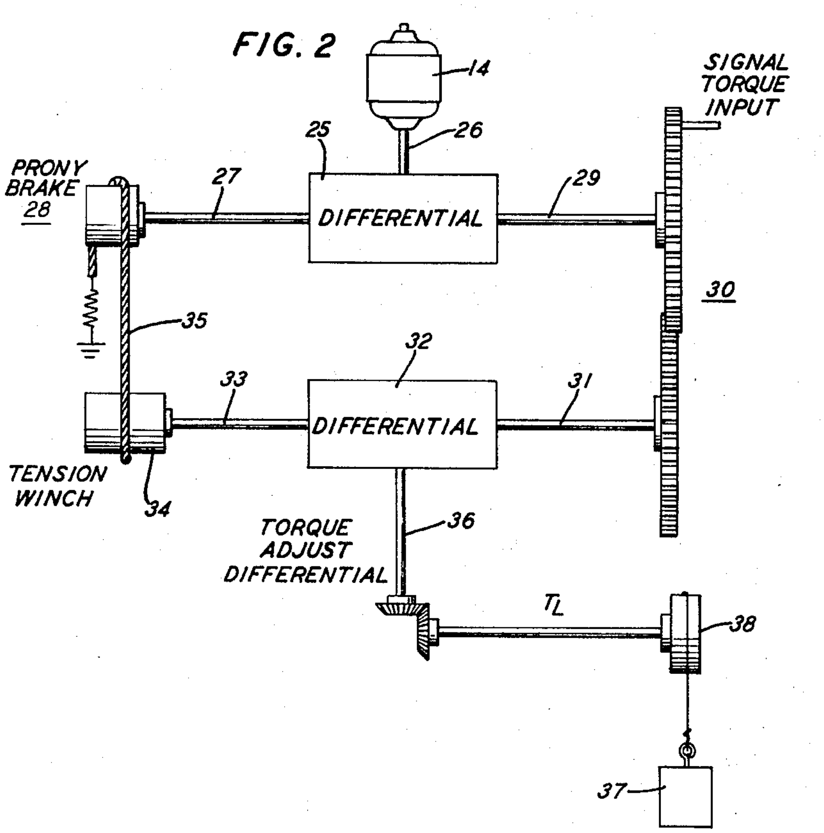
FIG. 2 is a second embodiment of the invention in which the idler torque is automatically adjusted as a function of the load torque.

As noted in the discussion above, the amount of externally applied signal torque, T, required to overcome the useful load torque, $T_L$, is given by $T=T_L-T_i$. It is apparent from this relationship that more heavily loading the idler shaft has the effect of reducing the amount of signal torque required. Thus, in setting up the amplifier, the strap on the Prony brake is tightened until the signal torque required to overcome the load torque is reduced to some prescribed minimum. It is equally obvious, however, that this setting of the Prony brake is only optimum for a prescribed load and that new Prony brake settings are required as the load changes. It would be most advantageous, if the loading on the idler shaft were capable of adjusting automatically to variations in load. Such an arrangement is illustrated in FIG. 2.

In this second embodiment of the invention, two differentials are used. The first differential 25 is the parametric amplifier differential. As in the embodiment of FIG. 1, one of the shafts 26 is a motor-driven pumping shaft. A second shaft 27 is dissipatively loaded by means of a Prony brake 28 and constitutes the idler shaft. The third shaft 29 constitutes the signal shaft. However, unlike the embodiment of FIG. 1, the signal shaft does not connect directly to the useful load. Instead, shaft 29 is connected by means of a gear train 30 to a shaft 31 of a second differential 32. This second differential serves as a torque adjust differential which serves to adjust the torque on the idler shaft as a function of the load torque.

To this end, a second shaft 33 includes a tension which 34 to which the Prony brake strap 35 is connected.

The output load, in the form of a weight 37, is connected to the third shaft 36 of differential 32 by means of a drum 38.

The operation of the embodiment of FIG. 2 is the same as the operation of the embodiment of FIG. 1 with the added feature that the output load torque $T_L$ on shaft 36 is communicated to shaft 33, and to the tension winch 34, through differential 32. Whereas the torque on the idler shaft 12 in the embodiment of FIG. 1 was a fixed quantity, the torque applied to the idler shaft 27 in the embodiment of FIG. 2 is a function of the load torque. Thus, the amplifier can be adjusted to have a fixed gain that is independent of variations in the load torque. The gain is given by $$G=\frac{1}{1-k}$$

where G is the torque gain ratio, and $k$ is the feedback coefficient of the load torque $T_L$ to the idler torque $T_i$ at the Prony brake via differential 32, given by $$k=\frac{T_i}{T_L}$$

In the two illustrative embodiments of the invention described above, the constants N and M were both equal to 1/2. It is apparent, however, that by means of gears, non-slipping belts and the like, various modifications and changes can be made in which the constants N and M assume other values, both negative and positive. Whatever the modification, however, the system is characterized by an idler shaft which dissipates power that is totally uncorrelated to the signal. At worst, this power is totally lost. However, to improve the efficiency of the amplifier, the idler power can be used as a heat source in a thermal feedback system which supplies some of the pumping power. Alternatively, the Prony brake, which was merely intended to be illustrative of one type of load which can be used to load the idler shaft, can be replaced by a generator. This generator can, in turn, be connected to the power lines and, thereby, supply some of the pumping power required in response to variations in the load. If such a dynamic braking system is used in the embodiment of FIG. 2, the torque adjust differential 32 would operate to control the load on the generator.

While various arrangements can be employed to make use of the idler power, it is also desirable to design the system so as to minimize this potential loss. The embodiment of FIG. 2 does this to the extent that the torque developed in the idler circuit is caused to vary as a function of the load torque. Thus, when the load torque is low, the idler torque is also low, thus reducing the loss in the system.

A further reduction in idler power can be realized by operating the pump motor at the lowest speed consistent with the anticipated needs of the system. Thus, if it is anticipated that the signal shaft speed will not exceed $\omega_1$, the pump motor speed should be designed so as not to exceed $\omega_1/N$.

While the pumping power was applied to what is generally referred to as the "drive" shaft of differentials 10 and 25, it is to be emphasized that this was merely intended to be illustrative. It will be noted, in this regard, that Equations 1 and 2 are completely general and, hence, there are no restrictions as to which of the several shafts is used as the pumping shaft, the idler shaft or the signal shaft.

In all cases it is understood that the above-described arrangements are illustrative of only a small number of the many possible specific embodiments which can represent applications of the principles of the invention. For example, the oscillating mode of operation can be used to drive the signal shaft. In this mode of operation, the useful load torque is overcome by controlling the idler shaft torque. Specifically, the idler shaft torque is increased from a value which is less than that required to overcome the load torque to an amplitude greater than that required to overcome the load torque.

In a further application of the principles of the invention, it is recognized that in the signal shaft, the torque developed by the load and the torque developed by the idler shaft oppose each other. If these opposing torques are made approximately equal, the signal shaft can then be made to rotate in either direction by the application of an extremely small extrenally applied torque.

If the useful load comprises a simple weight, the externally applied torque required to lower this weight is, and remains, extremely small until the weight is lowered sufficiently so that it comes to rest on a solid surface. This, for example, could be the ocean bottom in a situation in which the device is used for sounding purposes. Once this occurs, the torque previously developed in the signal shaft by the weight is reduced to zero, and the idler torque is no longer counter-balanced. Any attempt to further "lower" the weight requires the application of a torque equal to the idler torque. This sudden and significant increase in the amplitude of the externally applied torque required to lower the weight is a positive indication that bottom has been reached.

Thus, numerous and varied other arrangements can readily be devised in accordance with these principles by those skilled in the art without departing from the spirit and scope of the invention.

What is claimed is:

1. A mechanical amplifier comprising:

first and second mechanical differentials each having three rotatable shafts;

means for driving one of the shafts of said first differential at a substantially constant angular velocity;

a useful load torque $T_L$ applied to one of the shafts of said second differential;

means for coupling a second shaft of said first differential to a second shaft of said second differential;

means for applying an external torque to said second shafts;

means for developing a torque $T_i$ less than $T_L$ in the third shaft of said first differential;

and means connected to the third shaft of said second differential for varying the torque $T_i$ developed in the third shaft of said first differential.

2. The amplifier according to claim 1 wherein a friction brake is used to develop said torque $T_i$ in said third shaft of said first differential;

and wherein said torque $T_i$ is varied by means of a tension winch connected to the third shaft of said second differential;

said tension winch being adapted to vary the amount of friction developed by said friction brake.

References Cited

UNITED STATES PATENTS

| | | | |
|---|---|---|---|
| 696,301 | 3/1902 | Barnard | 74—777 |
| 1,685,461 | 9/1928 | Nichols | 74—751 |
| 1,910,661 | 5/1933 | Van Norden | 74—777 |
| 2,094,730 | 10/1937 | Vandenput | 74—777 |
| 2,160,447 | 5/1939 | Turney | 74—777 |
| 2,309,759 | 2/1943 | Ferguson | 74—777 X |
| 2,576,872 | 11/1951 | Young | 74—661 |

FRED C. MATTERN, Jr., *Primary Examiner.*

THOMAS C. PERRY, *Assistant Examiner.*